United States Patent
Eatherly

(10) Patent No.: US 10,773,573 B1
(45) Date of Patent: Sep. 15, 2020

(54) RETRACTABLE WINDSHIELD FILM APPARATUS

(71) Applicant: Heather Eatherly, Castalian Springs, TN (US)

(72) Inventor: Heather Eatherly, Castalian Springs, TN (US)

( * ) Notice: Subject to any disclaimer, the term of this patent is extended or adjusted under 35 U.S.C. 154(b) by 49 days.

(21) Appl. No.: 16/281,271

(22) Filed: Feb. 21, 2019

(51) Int. Cl.
*B60J 3/02* (2006.01)

(52) U.S. Cl.
CPC .................................. *B60J 3/0286* (2013.01)

(58) Field of Classification Search
CPC ........ B60J 1/2091; B60J 1/2011; B60J 11/08; B60J 3/02; B60J 1/2027; B60J 1/208; B60J 3/04; B60J 1/002; B60J 1/2019
USPC ....... 296/97.1, 97.7, 97.9, 97.12, 97.8, 97.4; 160/370.21, 368.1, 250, 263, 265, 84.1
See application file for complete search history.

(56) References Cited

U.S. PATENT DOCUMENTS

| | | |
|---|---|---|
| 1,931,438 A | 10/1933 | Hitz |
| 2,445,473 A | 7/1948 | Constant |
| 2,556,950 A | 6/1951 | Walker |
| 4,824,161 A | 4/1989 | Lee |
| 5,100,194 A * | 3/1992 | Decker .................. B60J 1/2011 160/370.21 |
| 6,131,986 A * | 10/2000 | Rosen ..................... B60J 3/0204 296/97.12 |
| D434,357 S | 11/2000 | Raevsky |
| 6,267,431 B1 * | 7/2001 | Watkins ................. B60J 1/2019 296/97.1 |
| 6,644,714 B2 | 11/2003 | Boyle |
| 7,143,805 B1 * | 12/2006 | Weir ..................... B60J 1/2063 160/370.22 |
| 7,233,176 B2 * | 6/2007 | Sharma .................... H03K 5/08 326/83 |
| 7,431,376 B1 | 10/2008 | Marszalek |
| 2012/0049564 A1 * | 3/2012 | Haase .................... B60J 1/2044 296/97.8 |
| 2016/0303951 A1 * | 10/2016 | Masih ................... B60J 1/2077 |

* cited by examiner

*Primary Examiner* — D Glenn Dayoan
*Assistant Examiner* — Sunsurraye Westbrook

(57) ABSTRACT

A retractable windshield film apparatus for reducing glare includes a film housing having a slot extending therethrough. An axle coaxially extends within the film housing. A spring is coupled to the axle. A spool is coupled to the spring coaxially to the axle. A tinted film has a fixed end coupled to the spool and a free end extending through the slot. A lead bar is coupled to the free end of the tinted film. A track is coupled to the film housing. The track has a housing end coupled to the film housing and a distal end. The lead bar is slidably engageable within the track. An engagement mechanism is coupled to the distal end of the track to secure the tinted film in the alternate extended position. Each of the film housing and the track are configured to attach to a windshield of a car.

8 Claims, 6 Drawing Sheets

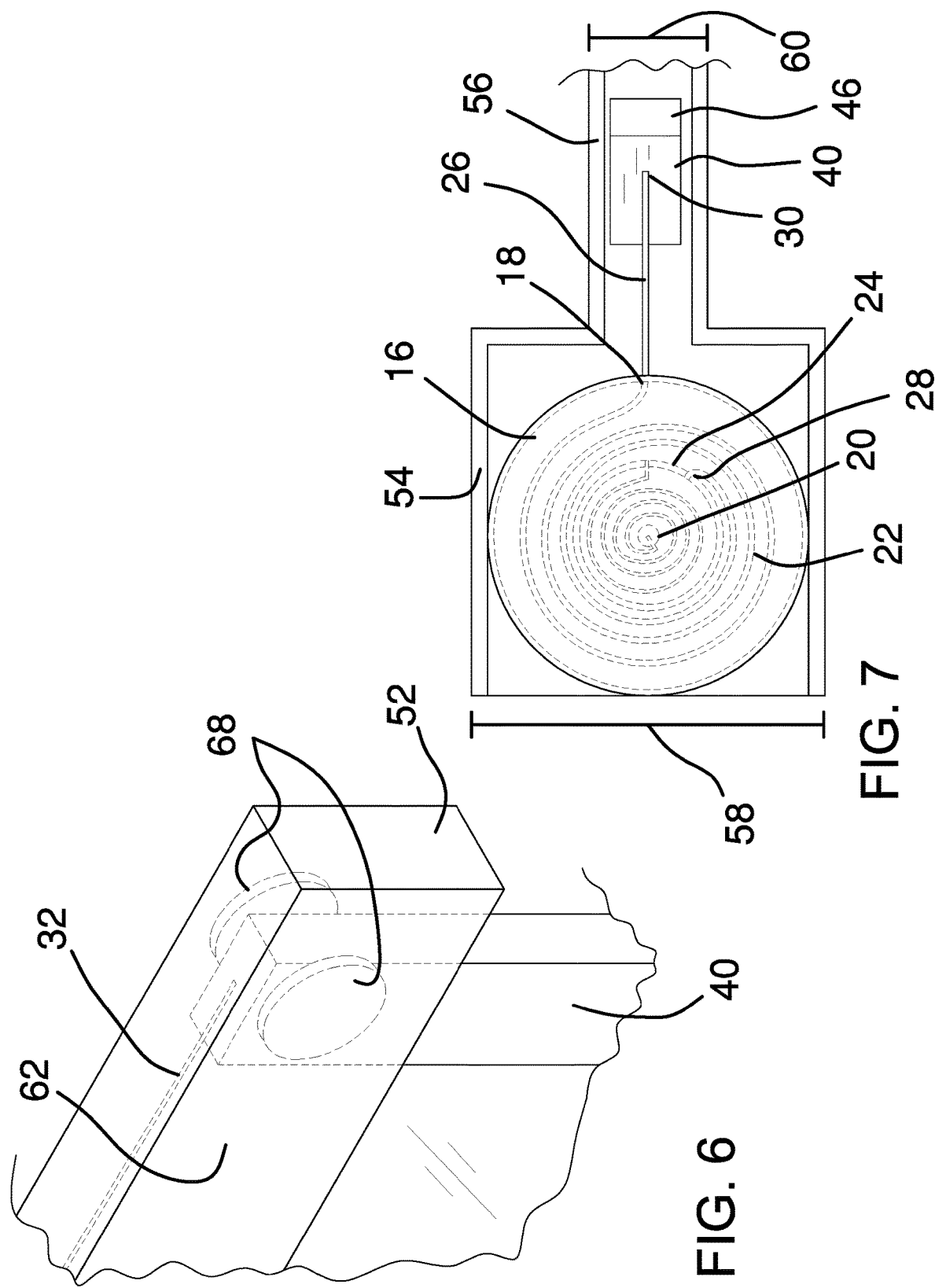

US 10,773,573 B1

RETRACTABLE WINDSHIELD FILM APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to windshield films and more particularly pertains to a new windshield film for reducing glare.

BRIEF SUMMARY OF THE INVENTION

An embodiment of the disclosure meets the needs presented above by generally comprising a film housing having a top end, a bottom end, and a wall. The wall has a slot extending therethrough from proximal the top end to proximal the bottom end. An axle coaxially extends from the top end to the bottom end within the film housing. A spring is coupled to the axle. A spool is coupled to the spring and coaxially extends from proximal the top end of the film housing to proximal the bottom end. The spool is rotatable around the axle to compress the spring. A tinted film has a fixed end coupled to the spool, a free end extending through the slot, a top edge oriented towards the top end, and a bottom edge oriented towards the bottom end. The tinted film is windable around the spool. The tinted film has a wound position with the free end adjacent the slot and an alternate extended position extending from the film housing. A lead bar is continuously coupled to the free end of the tinted film. The lead bar has a top side and a bottom side. A track is coupled to the film housing. The track has a housing end coupled to the top end of the film housing and a distal end. The top side of the lead bar is slidably engageable within the track from adjacent the housing end to the distal end. An engagement mechanism is coupled to the distal end of the track and is selectively engageable with the top side of the lead bar to secure the tinted film in the alternate extended position. Each of the film housing and the track are configured to attach to a windshield of a car.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a detail view of an embodiment of the disclosure.

FIG. 7 is a detail view of an embodiment of the disclosure.

DETAILED DESCRIPTION OF THE INVENTION

Figure 1:
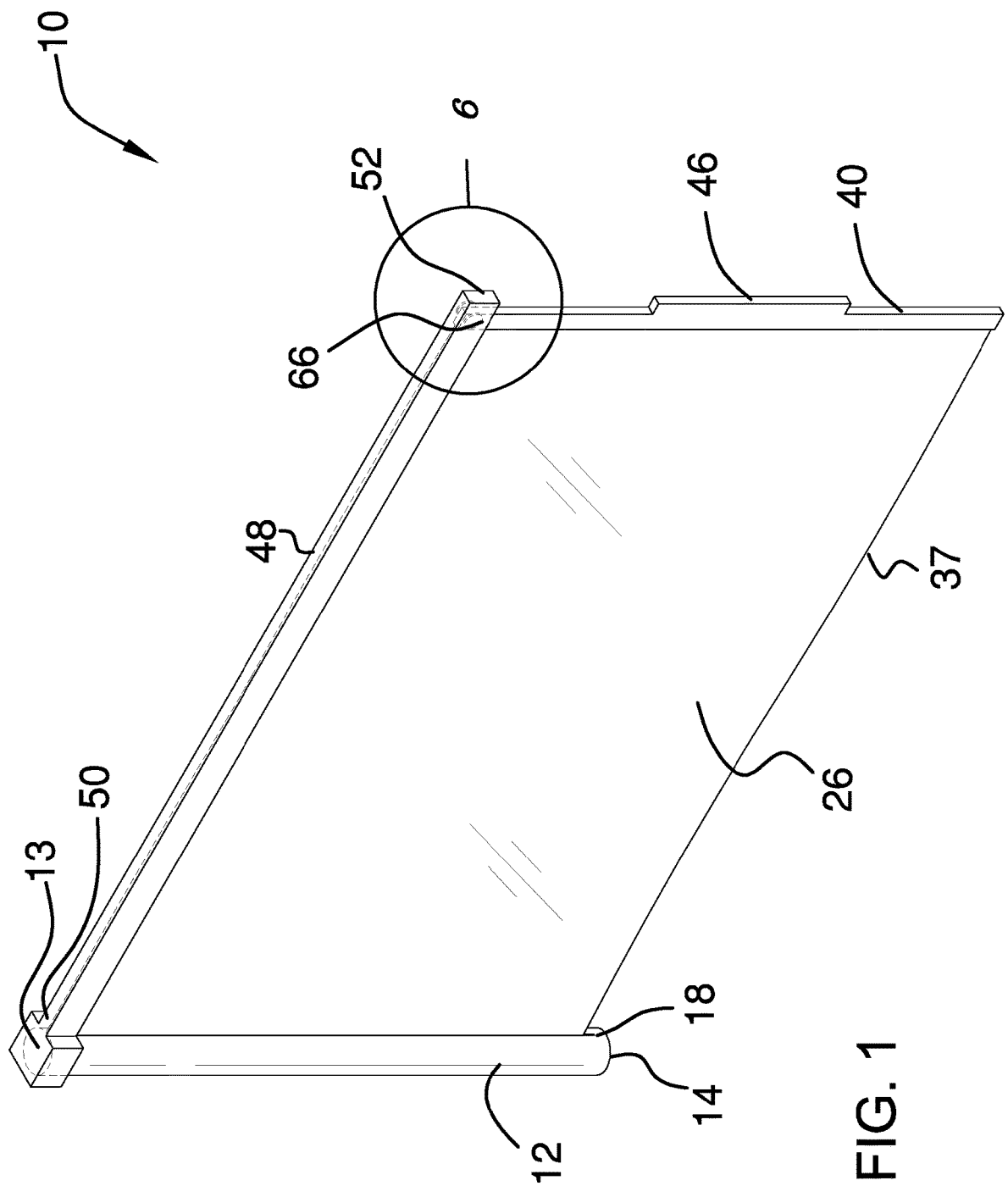
FIG. 1 is an isometric view of a retractable windshield film apparatus according to an embodiment of the disclosure.
Figure 2:
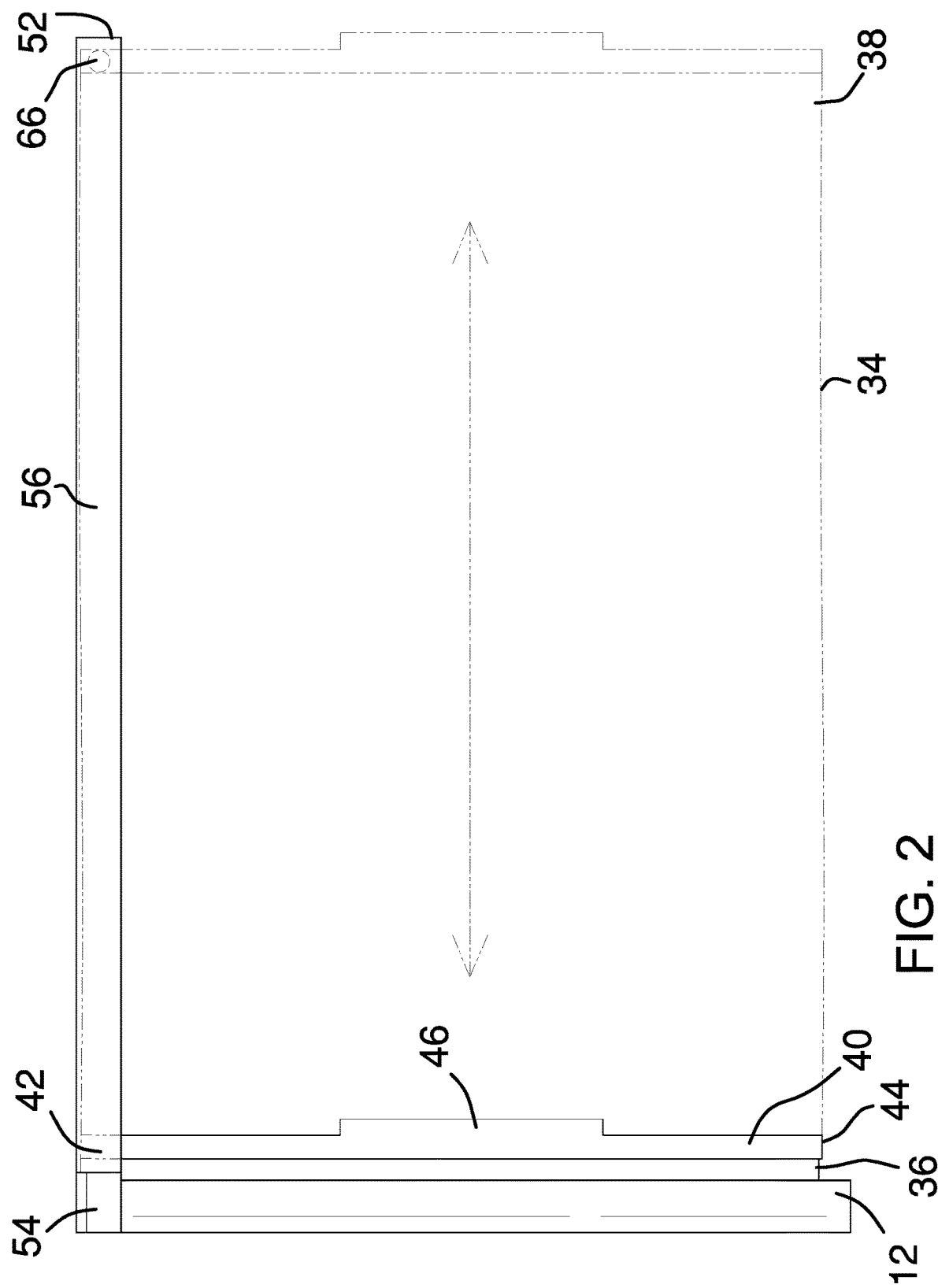
FIG. 2 is a front elevation view of an embodiment of the disclosure.
Figure 4:
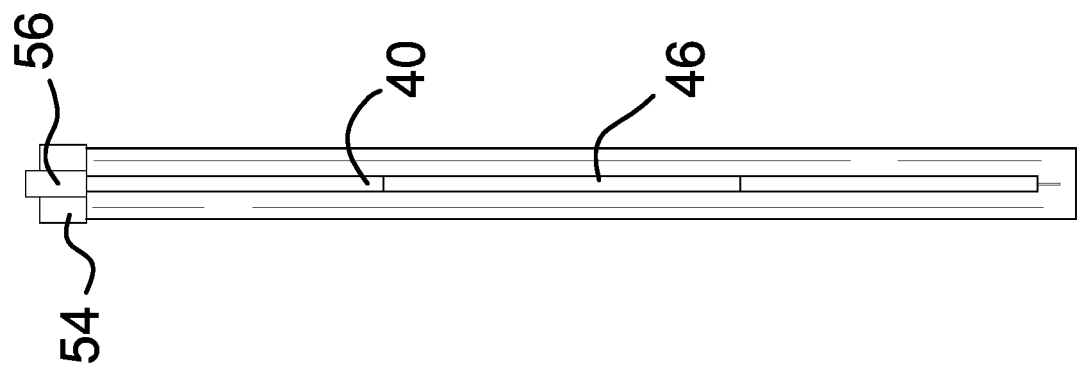
FIG. 4 is a side elevation view of an embodiment of the disclosure.
Figure 3:
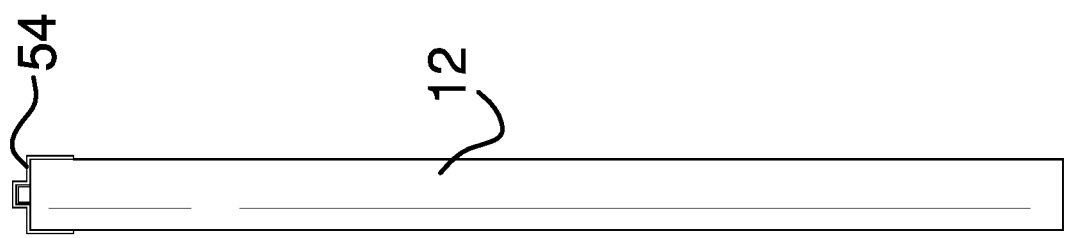
FIG. 3 is a side elevation view of an embodiment of the disclosure.
Figure 5:
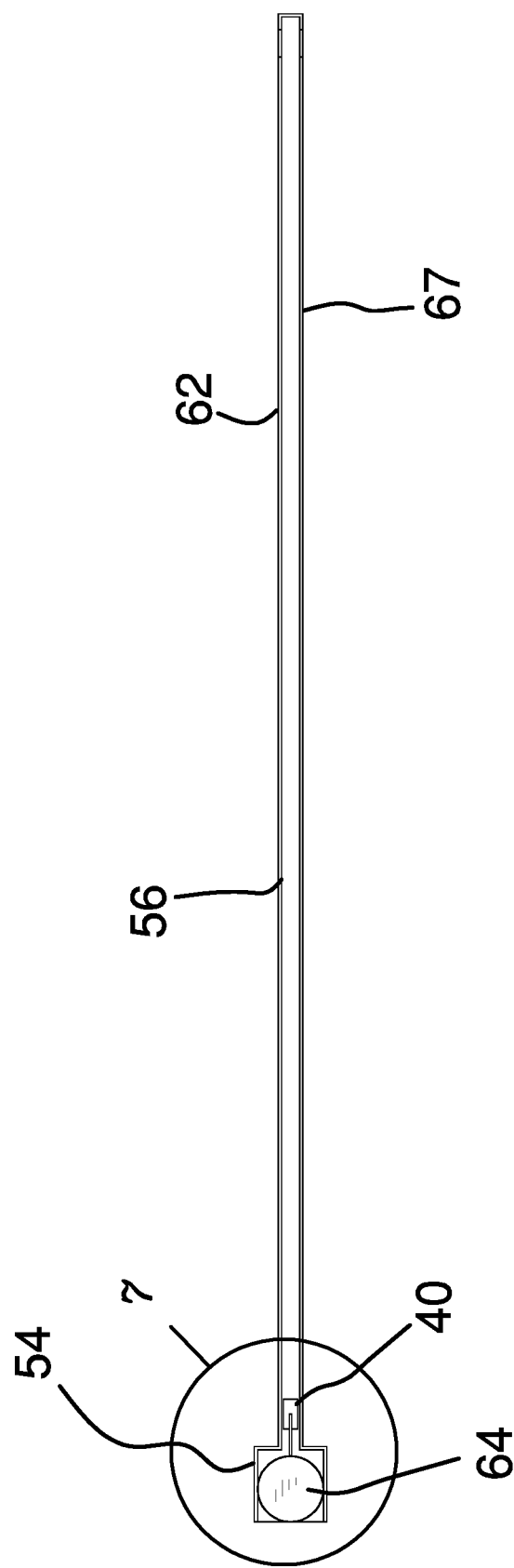
FIG. 5 is a bottom plan view of an embodiment of the disclosure.
Figure 8:
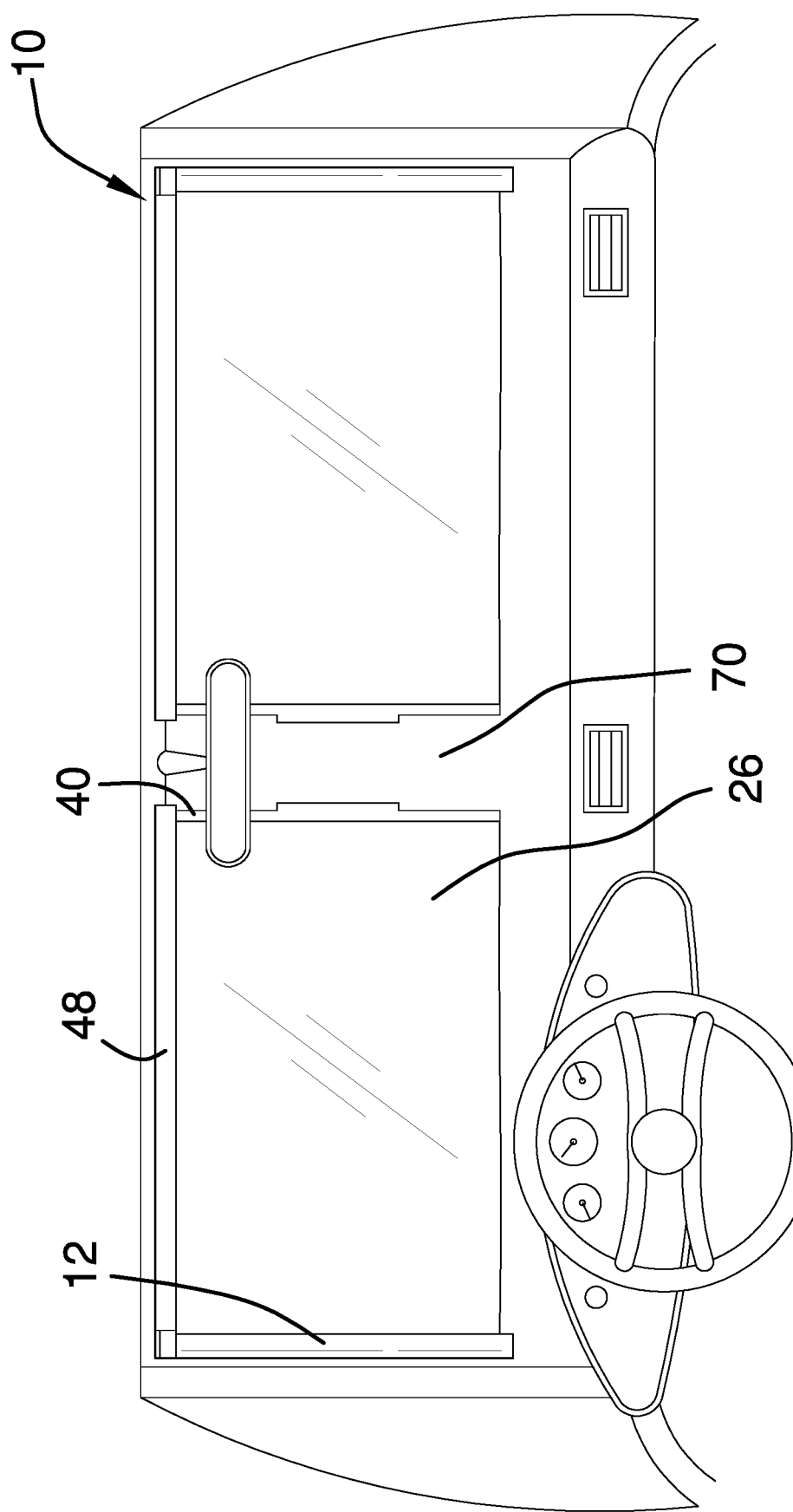
FIG. 8 is an in-use view of an embodiment of the disclosure.

With reference now to the drawings, and in particular to FIGS. 1 through 8 thereof, a new windshield film embodying the principles and concepts of an embodiment of the disclosure and generally designated by the reference numeral 10 will be described.

As best illustrated in FIGS. 1 through 8, the retractable windshield film apparatus 10 generally comprises a film housing 12 having a top end 13, a bottom end 14, and a wall 16. The wall 16 has a slot 18 extending therethrough from proximal the top end 14 to proximal the bottom end 16. The film housing 12 may be tubular. An axle 20 coaxially extends from the top end 14 to the bottom end 16 within the film housing 12. A spring 22 is coupled to the axle 20. A spool 24 is coupled to the spring and coaxially extends from proximal the top end 14 of the film housing to proximal the bottom end 16. The spool 24 is rotatable around the axle 20 to compress the spring 22.

A tinted film 26 is coupled to the spool 24. The tinted film 26 has a fixed end 28 coupled to the spool 24, a free end 30 extending through the slot 18, a top edge 32 oriented towards the top end 13, and a bottom edge 34 oriented towards the bottom end 14. The tinted film 26 is windable around the spool 24 and has a wound position 36 with the free end 30 adjacent the slot 18 and an alternate extended position 38 extended from the film housing 12. The tinted film 26 may be polarized. A lead bar 40 is continuously coupled to the free end 30 from the top edge 32 to the bottom edge 34. The lead bar 40 has a top side 42 and a bottom side 44. The lead bar 40 may have a handle 46 and is ferromagnetic.

A track 48 is coupled to the film housing 12. The track 48 has a housing end 50 and a distal end 52. The track 48 may comprise a housing cap 54 coupled to the top end 13 of the film housing and an extension 56 coupled to the housing cap 54. The housing cap 54 is rectangular prismatic and has a first width 58 wider than a second width 60 of the extension 56 to the distal end 52. The extension 56 has a front wall 62 and a rear wall 64. The top side 42 of the lead bar is slidably engageable between the front wall 62 and the rear wall 64 within the track 48 from adjacent the housing cap 54 to the distal end 52. An engagement mechanism 66 is coupled to the track 48 and may be a pair of magnets 68. The pair of magnets 68 is coupled to each of the front wall 62 and the rear wall 64 of the extension at the distal end 52. The engagement mechanism 66 is selectively engageable with the top side 42 of the lead bar to secure the tinted film 26 in the alternate extended position 38. When freed, the spring 22 rotates the spool 24 to rewind the tinted film 26 to the wound position 36.

In use, each of the film housing 12 and the track 48 are configured to attach to a windshield 70 of a car. The lead bar 40 is secured by the handle 46 to pull the tinted film 26 to the alternate extended position 38 where the pair of magnets 68 engages the ferromagnetic top side 42. The retractable windshield film apparatus 10 is attached to both sides of the windshield 70 and when each is in the alternate extended position 38 the windshield 70 is covered by the tinted film 26 to protect the driver's vision from glare.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A retractable windshield film apparatus comprising:
   a film housing, the film housing having a top end, a bottom end, and a wall, the wall having a slot extending therethrough from proximal the top end to proximal the bottom end;
   an axle coupled to the film housing, the axle coaxially extending from the top end to the bottom end within the film housing;
   a spring coupled to the axle;
   a spool coupled to the spring, the spool coaxially extending from proximal the top end of the film housing to proximal the bottom end, the spool being rotatable around the axle to compress the spring;
   a tinted film coupled to the spool, the tinted film having a fixed end coupled to the spool, a free end extending through the slot, a top edge oriented towards the top end, and a bottom edge oriented towards the bottom end, the tinted film being windable around the spool, the tinted film having a wound position with the free end adjacent the slot and an alternate extended position extending from the film housing;
   a lead bar coupled to the tinted film, the lead bar being continuously coupled to the free end, the lead bar having a top side and a bottom side;
   a track coupled to the film housing, the track having a housing end and a distal end, the housing end being coupled to the top end of the film housing, the top side of the lead bar being slidably engageable within the track from adjacent the housing end to the distal end;
   an engagement mechanism coupled to the track, the engagement mechanism being coupled to the distal end of the track, the engagement mechanism being selectively engageable with the top side of the lead bar to secure the tinted film in the alternate extended position;
   wherein each of the film housing and the track are configured to attach to a windshield of a car.

2. The retractable windshield film apparatus of claim 1 further comprising the film housing being tubular.

3. The retractable windshield film apparatus of claim 1 further comprising the tinted film being polarized.

4. The retractable windshield film apparatus of claim 1 further comprising the lead bar having a handle.

5. The retractable windshield film apparatus of claim 1 further comprising the track comprising a housing cap coupled to the top end of the film housing and an extension coupled to the housing cap, the housing cap being rectangular prismatic and having a first width, the extension having a second width extending to the distal end, the second width being less than the first width.

6. The retractable windshield film apparatus of claim 5 further comprising the extension having a front wall and a rear wall, the top side of the lead bar being slidably engageable between the front wall and the rear wall.

7. The retractable windshield film apparatus of claim 6 further comprising the engagement mechanism being a pair of magnets and the lead bar being ferromagnetic, the pair of magnets being coupled to each of the front wall and the rear wall of the extension at the distal end.

8. A retractable windshield film apparatus comprising:
   a film housing, the film housing having a top end, a bottom end, and a wall, the wall having a slot extending therethrough from proximal the top end to proximal the bottom end, the film housing being tubular;
   an axle coupled to the film housing, the axle coaxially extending from the top end to the bottom end within the film housing;
   a spring coupled to the axle;
   a spool coupled to the spring, the spool coaxially extending from proximal the top end of the film housing to proximal the bottom end, the spool being rotatable around the axle to compress the spring;
   a tinted film coupled to the spool, the tinted film having a fixed end coupled to the spool, a free end extending through the slot, a top edge oriented towards the top end, and a bottom edge oriented towards the bottom end, the tinted film being windable around the spool, the tinted film having a wound position with the free end adjacent the slot and an alternate extended position extending from the film housing, the tinted film being polarized;

a lead bar coupled to the tinted film, the lead bar being continuously coupled to the free end, the lead bar having a top side and a bottom side, the lead bar having a handle, the lead bar being ferromagnetic;

a track coupled to the film housing, the track having a housing end and a distal end, the track comprising a housing cap coupled to the top end of the film housing and an extension coupled to the housing cap, the housing cap being rectangular prismatic and having a first width, the extension having a second width extending to the distal end, the second width being less than the first width, the extension having a front wall and a rear wall, the top side of the lead bar being slidably engageable between the front wall and the rear wall within the track from adjacent the housing cap to the distal end;

an engagement mechanism coupled to the track, the engagement mechanism being a pair of magnets, the pair of magnets being coupled to each of the front wall and the rear wall of the extension at the distal end, the engagement mechanism being selectively engageable with the top side of the lead bar to secure the tinted film in the alternate extended position;

wherein each of the film housing and the track are configured to attach to a windshield of a car.

* * * * *